United States Patent [19]

Veaux et al.

[11] Patent Number: 4,610,411
[45] Date of Patent: Sep. 9, 1986

[54] STEERABLE AIRCRAFT LANDING GEAR HAVING AUTOMATIC SAFETY DECLUTCHING AND ENCLUTCHING

[75] Inventors: Jacques Veaux, Chatillon-Sous-Bagneux; Jean-Michel Dubos; Pierre Woerner, both of Fontenay-Aux-Roses, all of France

[73] Assignee: Messier-Hispano-Bugatti (S.A.), Montrouge, France

[21] Appl. No.: 756,120

[22] Filed: Jul. 18, 1985

[30] Foreign Application Priority Data

Jul. 30, 1984 [FR] France ................................ 84 12046

[51] Int. Cl.$^4$ ............................................. B64C 25/50
[52] U.S. Cl. .................................. 244/50; 244/103 R; 180/151
[58] Field of Search ............................ 244/50; 91/4 R; 180/148, 151, 153, 161, 162; 280/272, 270; 74/388 PS, 498

[56] References Cited

U.S. PATENT DOCUMENTS

| 3,006,579 | 10/1961 | Frederick | 244/50 |
| 3,151,533 | 10/1964 | Hartel | 180/151 |
| 3,401,577 | 9/1968 | Partridge | 244/50 |

FOREIGN PATENT DOCUMENTS

1111552  5/1968  United Kingdom .
1287099  8/1972  United Kingdom .
1416806 12/1975  United Kingdom .

Primary Examiner—Galen Barefoot
Assistant Examiner—Lynn M. Fiorito
Attorney, Agent, or Firm—Sughrue, Mion, Zinn Macpeak & Seas

[57]  ABSTRACT

On a shaft (2) which carries a wheel there are mounted: firstly a toothed sector (3) which meshes with a rack (4) on a piston rod (5) which is a part of a double-acting hydraulic actuator (8); and secondly a cam (12) which acts on two rocking levers (13, 14) to apply a bolt (13B, 14B) against a stop face (10A, 10B) of the rod (5) when, by directly swivelling the wheel, the toothed sector (3) is disengaged from the rack (4).

10 Claims, 6 Drawing Figures

STEERABLE AIRCRAFT LANDING GEAR HAVING AUTOMATIC SAFETY DECLUTCHING AND ENCLUTCHING

The invention relates to steering a wheel which is capable of being declutched at the end of its steering control stroke in order to enable the wheel to be freely swivelled, and then of being automatically reenclutched in order to return to normal use of the wheel in complete safety.

BACKGROUND OF THE INVENTION

It has been known for several years that aircraft landing gear wheels or trains of wheels may be steerable in normal use by means of a double-acting hydraulic actuator. The actuator is disposed transversely to the post which contains a shaft having the wheel(s) disposed at its bottom end. The actuator comprises two opposing pistons interconnected by a common piston rod which has a toothed zone or rack in its middle, between the pistons. The rack meshes with a toothed sector fixed to rotate said shaft.

Because of its transverse disposition, the actuator can only be of limited length, such that the angular deflection of the toothed sector on the shaft which carries the wheels is limited to a value of less than ±90° about the straight ahead position. This limited value is too small for moving the aircraft in a confined space, e.g. in a hangar. Under such circumstances it is often desirable to be able to swivel the wheel through a much greater angle than +90°.

A widely used conventional solution consists in providing a decoupling member, such as a pin, for example, between the toothed sector and the wheel, which member is removed by hand, thereby enabling the wheel to be swivelled independently of the actuator. A serious drawback of such means is that safety is compromised since the wheel can no longer be steered from the pilot position if the decoupling member is not replaced.

Preferred embodiments of the present invention provide improved steerable aircraft landing gear in which the steered wheel(s) may be declutched at will from the hydraulic steering actuator while including intrinsic safety in the sense that coupling between the actuator and wheel(s) is automatically reestablished whenever the wheel is manually returned to the range of angular deflection which is under actuator control.

SUMMARY OF THE INVENTION

The present invention provides aircraft landing gear including a shaft provided at one end with at least one wheel, a toothed sector fixed to rotate with said shaft, and a hydraulic actuator disposed transversely to the shaft in the plane of the toothed sector, said actuator having two opposing pistons interconnected by a piston rod fitted with a rack in its longitudinally central portion, which rack meshes with the toothed sector to displace said sector between two extreme mesh points corresponding to the angular swivelling limits of the wheel under actuator control, wherein the piston rod has two opposing stop faces, which are longitudinally spaced thereon, and the piston rod is assembled with two pistons having the possibility of relative sliding over a sliding stroke of length L, whereas each piston has, beyond said end mesh points, an additional stroke of length $L_1$ chosen in correspondence with said sliding stroke, wherein the shaft is provided with a cam having a active surface situated outside the extent of the toothed sector, and wherein two locking means are movably mounted between the cam and the piston rod, each locking means having a first branch whose end co-operates with the cam, and a second branch which constitutes a bolt intended to co-operate with a corresponding stop face of the piston of when said piston rod has been displaced along the shorter of the sliding stroke L and the additional stroke $L_1$, beyond either of said end mesh points with the toothed sector, by manually maneuvering the wheel until said piston rod encounters an end of stroke abutment.

Preferably, the locking means are mounted to oscillate about respective shafts parallel to the shaft bearing the toothed sector and the cam.

Also preferably, each locking means includes a first branch whose free end is fitted with a cam follower wheel which co-operates with the cam and a second branch constituting a bolt intended to co-operate with the corresponding stop face of the piston rod.

Advantageously, each stop face is an inclined face situated in the opposite side of the piston rod from the rack and in the vicinity of one end of said rod.

In a preferred embodiment of the invention the locking means are situated on the opposite side of the piston rod from the shaft; further, both branches are connected to each other by a torsion bar whose stress increases when the first branch comes into contact with the active face of the cam and the bolt moves into a position bearing against the corresponding stop face of the piston rod. In the piston rod locking position, the rod abuts against the bottom of a piston which is itself in abutment against the bottom of the cylinder at the end of its additional stroke.

According to an improvement of the invention, the locking means are each connected to an auxiliary hydraulic manifold mounted on the hydraulic circuit of the actuator; when either locking means is in position locking the piston rod, it puts the hydraulic manifold into a position in which hydraulic supply to the actuator is interrupted.

BRIEF DESCRIPTION OF THE DRAWINGS

A preferred embodiment of the invention is described by way of example, with reference to the accompanying drawings, in which.

DESCRIPTION OF THE PREFERRED EMBODIMENT

Figure 1:
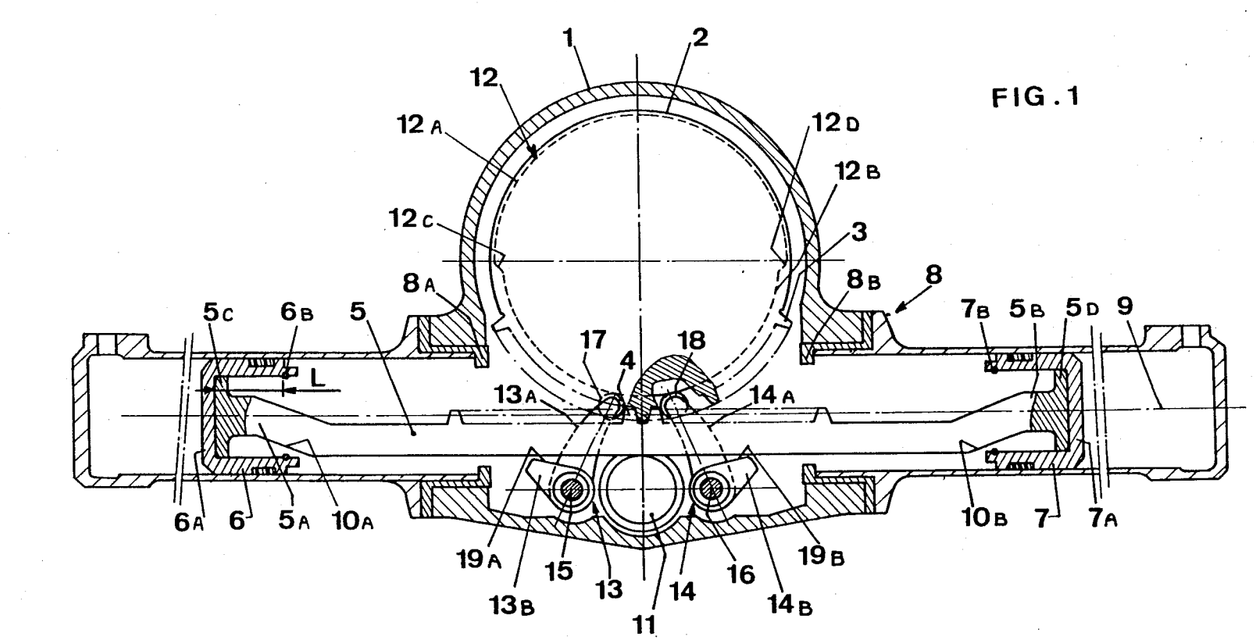
FIG. 1 is a section on a plane passing through the hydraulic actuator and perpendicular to the shaft carrying a steerable aircraft landing wheel in accordance with the invention, shown in the position corresponding to aircraft movement in a straight line.

FIG. 1 is a cross-section through a post 1 of an aircraft landing gear leg. A hollow shaft 2 is mounted in said post and a wheel (not shown) is disposed at the bottom of the shaft. The hollow shaft 2 has a toothed sector 3 on its outer face, and the angular extent of the toothed sector corresponds to a controllable angular deflection of wheel swivel which is ±65° in this example relative to a position allowing the aircraft to move in straight line.

The toothed sector 3 meshes with a rack 4 during controlled swivelling movements of the shaft 2 and of the wheel. The rack 4 is an integral part of a piston rod 5 which is common to two opposing pistons 6 and 7 respectively. These pistons belong to a transverse double-acting hydraulic actuator given an overall reference 8 which is fixed transversely to the post 1 in the plane of the toothed sector 3.

The arrangement described above is known and does not require further explanation.

The middle portion of the piston rod 5 bearing the rack 4 is offset sideways relative to the longitudinal geometrical axis 9 of the actuator 8 away from the toothed sector 3 in such a manner that the teeth mesh substantially on said geometrical axis 9. The opposite end portions 5A and 5B of the piston rod 5 are substantially centered on the geometrical axis 9 prior to their connection to the corresponding pistons 6 and 7 so as to be coaxial therewith. As a result, the piston rod 5 presents stop faces 10A and 10B which are inclined relative to the geometrical axis 9 and which interconnect the middle portion of the piston rod with its end portions 5A and 5B. These stop faces are on the opposite side of the piston rod from the side having the rack 4. At least one support wheel 11 is provided on the same opposite side from the meshing between the toothed sector 3 and the rack 4 to support the common piston rod 5 against bending, in a manner known per se.

The common piston rod 5 is not fixed to the two pistons 6 and 7. It is terminated by respective enlarged end portions 5C and 5D which are slidably mounted in corresponding ones of the pistons 6 and 7 between the bottoms 6A and 7A of said pistons and stop rings 6B and 7B engaged in corresponding grooves in the inside faces of the pistons close to their ends furthest from their bottoms 6A and 7A. The length L of the stroke of the piston rod 5 inside each piston, and the purpose thereof, are defined below.

Inside the actuator 8, when a piston is thrust by fluid under pressure ariving via the free end of the cylinder furthest from the toothed sector 3, the stroke of the piston 6 or 7 is limited by a respective inside abutment 8A or 8B. Each of the abutments 8A and 8B determines a limit to the action of the actuator 8 on swivelling the shaft 2 and the wheel, and corresponds to an end meshing point between the rack 4 and the toothed sector 3.

Figure 2:
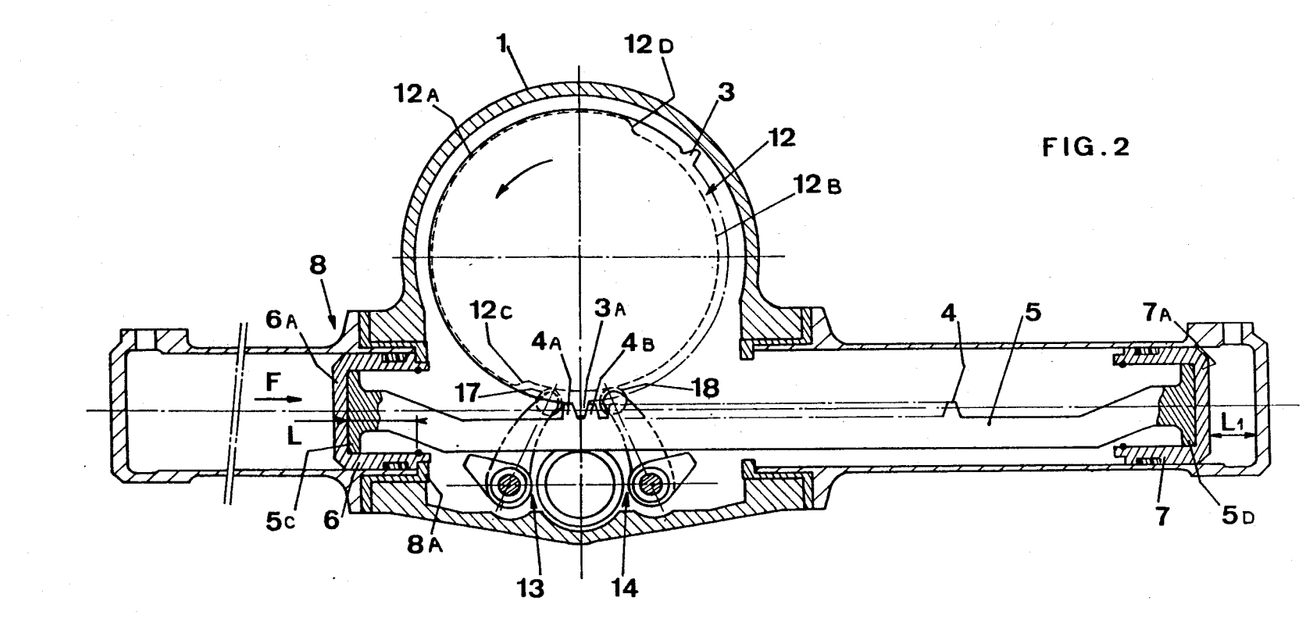
FIG. 2 is a similar view to FIG. 1 showing the hydraulic actuator swivelling the shaft to one of the end positions of its rack stroke, corresponding to maximum angular deflection of the wheel under actuator control.

When either of the pistons 6 or 7 stops against the corresponding abutments 8A or 8B, as shown in FIG. 2, the other piston 7 or 6 is at a distance $L_1$ from the bottom of the corresponding cylinder (FIG. 2). This distance $L_1$ is the length of an additional stroke made possible for the piston 6 or 7 towards the bottom of the cylinder.

The outer face of the hollow shaft 2 is provided, in the vicinity of the toothed sector 3, with a cam 12 which is circular for the most part and whose active lift surface 12A lies outside the angular extent of the toothed sector 3. For reasons explained below, the inactive surface 12B of the cam 12 extends beyond the ends of the toothed sector 13 before rising via symmetrical ramps 12C and 12D to the active surface 12A.

Two locking means 13 and 14 of the rocking lever type are symmetrically mounted on either side of the tooth meshing zone to rock about respective geometrical axes 15 and 16. These axes 15 and 16 are parallel to the hollow shaft 2 and are situated on the opposite side of the piston rod 5 to the side on which the hollow shaft is situated.

Each of the locking means 13 and 14 has a first branch 13A or 14A respectively whose free end is fitted with a cam-follower wheel 17 or 18 which is applied against the cam 12, and a second branch 13B or 14B which constitutes a bolt for cooperating with the corresponding stop face 10A or 10B of the piston rod 5.

The bolts 13B and 14B are situated in the transverse plane which contains the piston rod 5 and the toothed sector 3. They are symmetrically disposed on either side of the support wheel and each has a corresponding bearing face 19A, 19B which is inclined to the direction of the geometrical axis 9 and substantially parallel to the stop face 10A, 10B which corresponds thereto on the piston rod 5.

The branches 13A and 13B of the levers 13 and 14 are behind the piston rod 5 as seen in FIG. 1, in the transverse plane which contains the cam 12.

When the landing gear is used with wheel steering being controlled by the hydraulic actuator 8 between the extreme points of angular deflection controllable by said actuator, the bolts 13B and 14B do not come into contact with the piston rod 5 and do not interfere with back-and-forth motion thereof. At the same time, the cam-follower wheels 17 and 18 on the branches 13A and 14A are applied against the non-active face 12B of the cam 12 or against on outer abutment.

Figure 4:
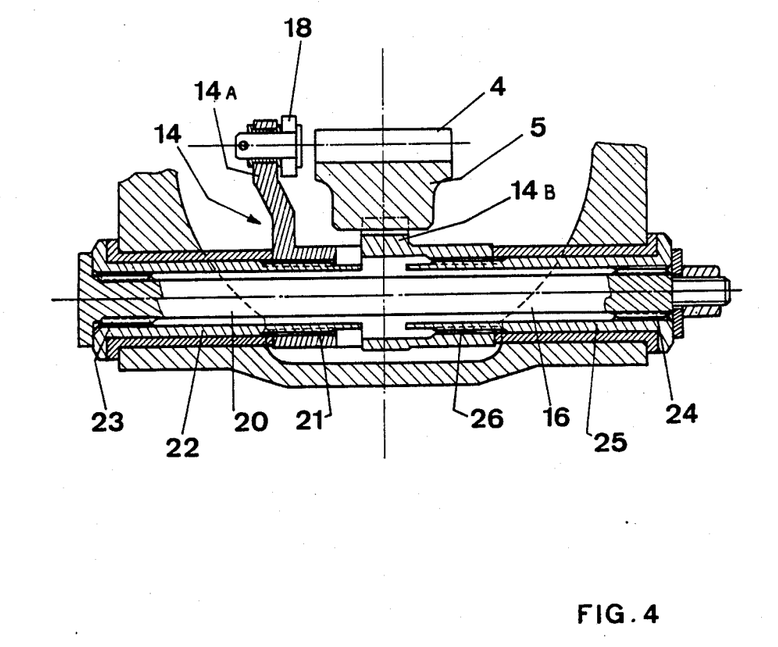
FIG. 4 is a detailed section on a broken line IV—IV of FIG. 3.

This application is obtained by resilient return means (not shown). Each locking means 13 and 14 includes a torsion bar 20 which is concentric with its rocking geometrical axis 15 or 16 as can be seen in FIG. 4. It can be seen in FIG. 4 that the lever 14 is fixed to rotate by means of corrugations 21 with one end of a thimble 22 whose opposite end is fixed to rotate by corrugations 23 with one end of the torsion bar 20. The end of the torsion bar is fixed to rotate by means of corrugations 24 with one end of a thimble 25 whose opposite end is fixed to rotate by means of corrugations 26 with the branch 14B. When the locking means 13 and 14 are not maneuvered by the cam 12, the torsion bar 20 is not stressed. It simply interconnects the two branches of the lever.

The steerable aircraft landing gear in accordance with the invention operates as follows.

From the centered position of FIG. 1, which corresponds to the aircraft moving in a straight line, the actuator 8 as powered with fluid under pressure via its left-hand end (as seen in FIG. 2) as indicated by an arrow F causes the hollow shaft 2 to rotate until reaching the end points of controlled shaft swivelling when the last tooth 3A of the toothed sector 3 is still meshed between the last two teeth 4A and 4B of the rack 4. In this position, the two cam-follower wheels 17 and 18 of the levers 13 and 14 are still applied against the nonactive face 12B of the cam 12.

The action of the actuator 8 is interrupted when the piston 6 moved by the fluid encounters the stop 8A. At this moment, the piston 6 is applied against the corresponding wide portion 5C of the piston rod 5. Likewise the piston rod 5 has its other wide portion 5D applied against the opposite piston 7 which it presses against. There still remains an additional stroke $L_1$ between the piston 7 and the bottom of the cylinder.

Figure 3:
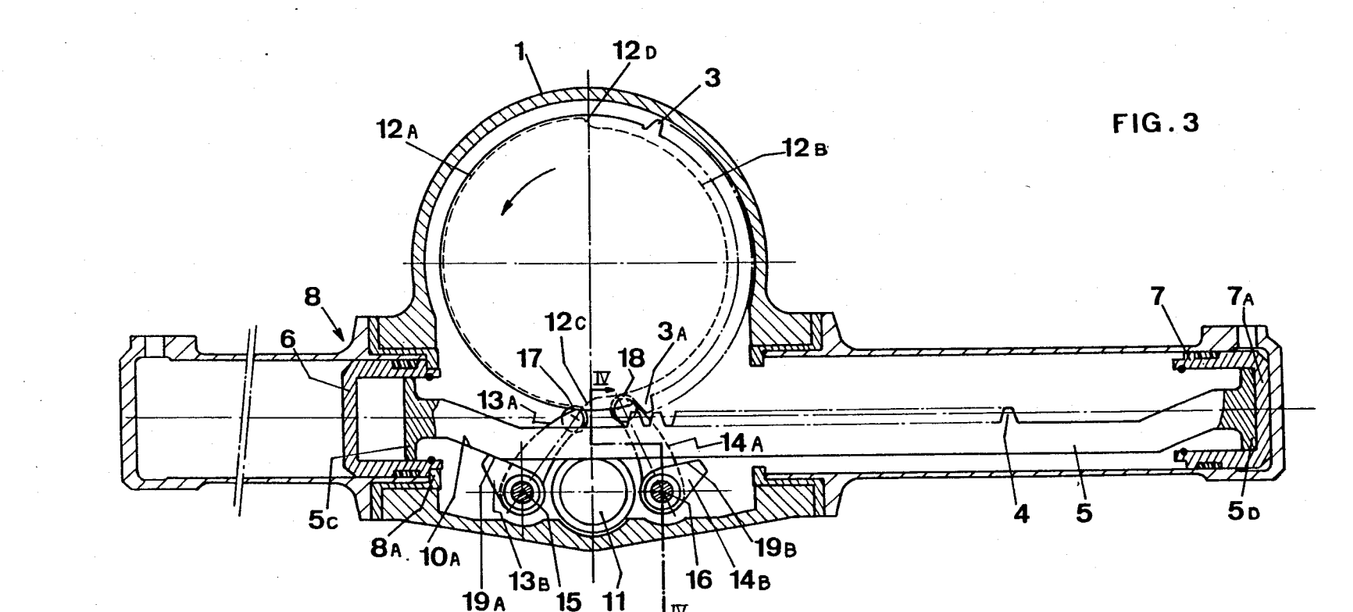
FIG. 3 is a similar view to FIG. 2 showing the steerable landing gear in accordance with the invention in the position in which the hydraulic actuator is locked, after meshing between the rack and the toothed sector has been disengaged by swivelling the shaft and its wheel through a greater angular deflection.

By acting directly on the shaft 2, or preferably on the wheel, manually or by means of a lever to swivel the wheel through a greater angle, the toothed sector 3 rotates and drives the rack 4, thereby displacing the piston rod 5 until the piston 7 pushed by the rod comes into abutment with the bottom of the cylinder after following its additional stroke $L_1$ (FIG. 3).

In this example, the additional stroke $L_1$ of the pistons in the cylinder is less than the sliding stroke L of the piston rod 5 within the pistons 6 and 7. Thus, when the piston rod 5 abuts against the bottom of the piston 7 which is itself in abutment against the bottom of the cylinder, the opposite end 5C of the piston rod 5 has still not reached the inner abutment 6B corresponding thereto in the opposite piston 6.

In a variant, the opposite arrangement could be provided with the inner abutments 6B and 7B being used as means for stopping the piston rod 5 in an accurate position in which the rack is just disengaged from the toothed sector 3.

The additional stroke $L_1$ (or the sliding stroke L, as the case may be) is chosen such that the toothed sector 3 disengages from meshing with the rack 4, that the stop face 10 of the piston rod 5 comes opposite the bearing face 19A of the bolt 13B, and that the cam-follower wheel 17 is met by the ramp 12C of cam 12 just prior to the active surface 12A thereof, thus coming into action. Any additional movement applied in the same direction to the wheel has the effect of causing the active surface 12A of the cam 2 to push against the first branch 13A, thereby causing the corresponding rocking action via the torsion bar 20 of the bolt 14A whose bearing face 19A is applied against the stop face 10A.

The cam-follower wheel 17 of the first branch 13A is lifted further by the active surface 12A of the cam 12 than the stroke of the bolt 14A prior to encountering the faces 19A-10A. The difference in displacement is absorbed by resilient deformation of the torsion bar 20. The torsion bar exerts a force by which the piston rod 5 is firmly held in position. It is then possible to freely swivel the wheel so long as the active surface 12A of the cam engages the cam-follower wheel 17, while at the same time the piston rod 5 and its rack 4 are firmly held in an accurate position.

When the wheel is swivelled in the opposite direction, at the moment when the active surface 12A of the cam 12 ceases to press against the first branch 13A, the piston rod 4 is released by the bolt 14A and meshing is re-established when the tooth 3A of the toothed sector 3 returns between the teeth 4A and 4B of the rack 4.

The landing gear operates in the same manner with the bolt 14 when the wheel is swivelled beyond the meshing limit in the opposite direction.

While the wheel is being used under steering control from the actuator, it may happen that an obstacle of some kind (a stone, a hole, . . . ) deflects the wheel suddenly beyond the meshing limit of the toothed sector 3 and the rack 4. In this situation, the instinctive reaction of straightening the wheel by means of the actuator runs the risk of causing the actuator to damage the bolt 13B or 14B which is then holding the piston rod as explained above.

If it is desired to avoid this risk, an improvement of the invention provides for each locking means 13, 14 (FIG. 5) to include a third arm 27A, 27B respectively which extends to the operating end of a corresponding slide valve 28A or 28B. The slide valves are mounted at opposite ends of a hydraulic fluid manifold 29 which is interposed on the hydraulic circuit feeding the actuator 8.

Figure 5:
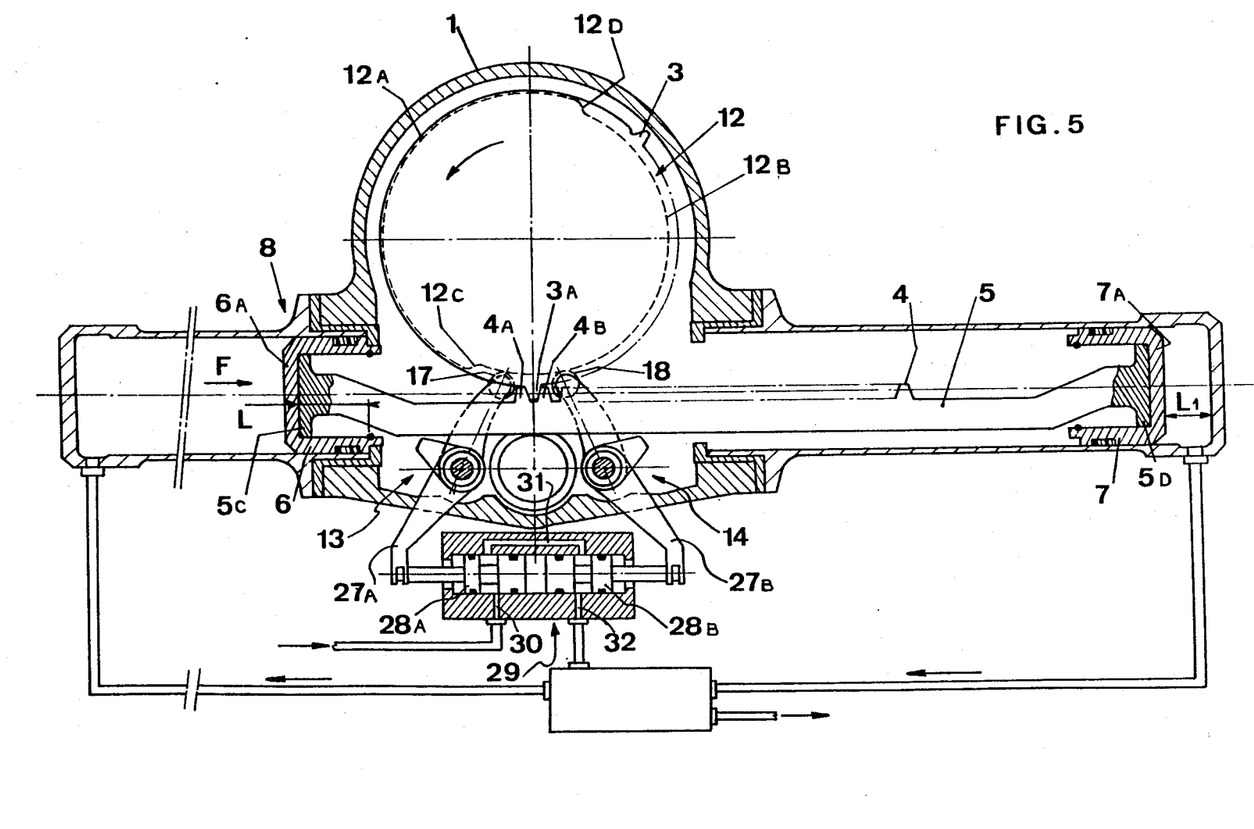
FIG. 5 is a similar view to FIG. 2 showing an improvement whereby the locking means are connected to the actuator's hydraulic manifold.

So long as the locking means 13 and 14 are controlled by the active face 12A of the cam 12, the slide valves 28A and 28B allow the hydraulic fluid to flow freely through the manifold 29 between a first transverse channel 30, a longitudinal channel 31, and a second transverse channel 32, as can be seen in FIG. 5.

Figure 6:
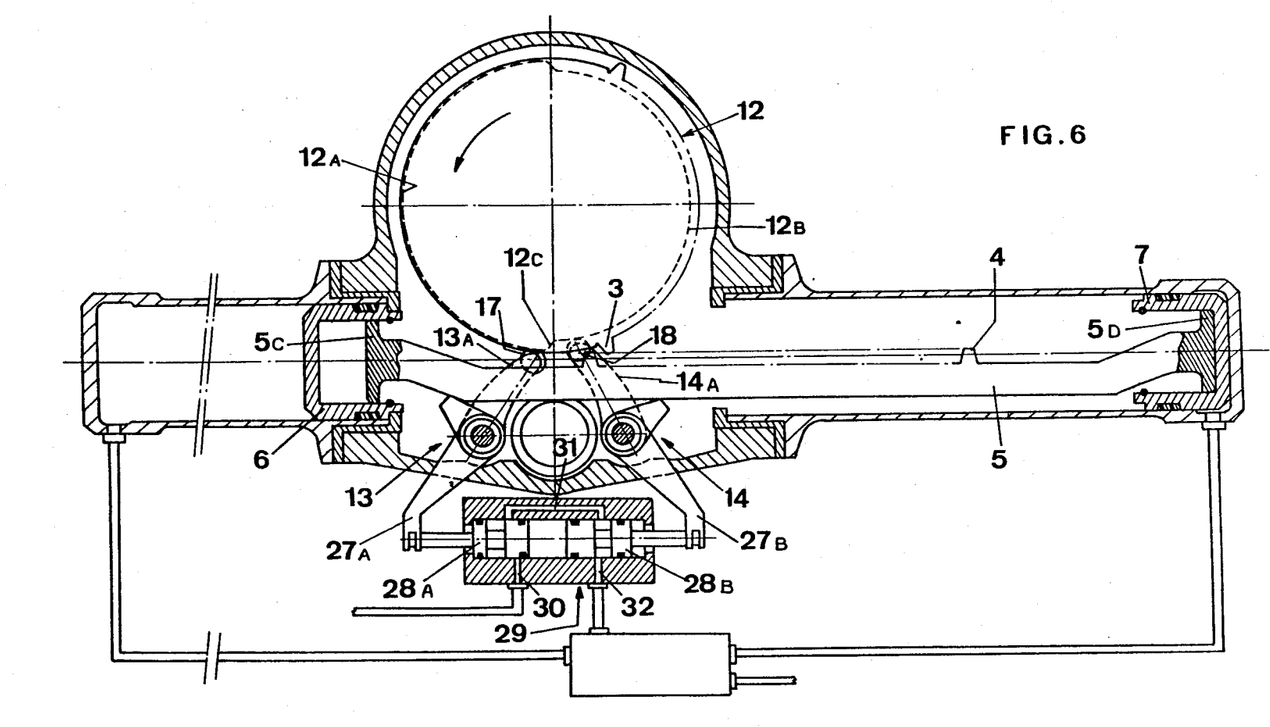
FIG. 6 is a similar view to FIG. 3 showing that hydraulic feed to the actuator is cut when the piston rod is in its locking position.

As soon as one of the locking means 13, see FIG. 6, is controlled by the cam 12 via its first branch 13A engaging the active face 12A, the third branch 27A rocks together with the first branch 13A and displaces the slide valve 28A in such a manner than the transverse channel 30 corresponding to said slide valve no longer communicates with the longitudinal channel 31. The actuator 8 can no longer be fed with hydraulic fluid until the rack 4 has been returned into engagement with the toothed sector 3.

We claim:

1. Aircraft landing gear including a wheel bearing shaft, a toothed sector fixed to rotate with said shaft, and a hydraulic actuator disposed transversely to the shaft in the plane of the toothed sector, said actuator including two opposing first pistons interconnected by a piston rod, a rack fitted to said rod in its longitudinally central portion, said rack meshing with the toothed sector to displace said sector between two extreme mesh points corresponding to the angular swivelling limits of the shaft bearing wheel under actuator control, said piston rod including two opposing faces, which faces are longitudinally spaced thereon, and the piston rod being assembled with two second pistons which slide over a sliding stroke of length L, said first and second pistons further having beyond said end mesh points, an additional stroke of length $L_1$ chosen in correspondence with said sliding stroke, the shaft being provided with a cam having an active surface circumferentially outside the extent of the toothed sector, and two locking means movably mounted between the cam and the piston rod, each locking means having a first branch whose end operatively engages with the cam, and a second branch which constitutes a bolt actively engageable with a corresponding stop face of the piston rod when said piston rod has been displaced along the sliding stroke L and the additional stroke $L_1$, beyond either of said end mesh points with the toothed sector, by manually maneuvering the wheel bearing shaft until said piston rod encounters an end of stroke abutment.

2. Landing gear according to claim 1, further comprising means for mounting each locking means to rock about a respective axis which is parallel to the shaft carrying the toothed sector.

3. Landing gear according to claim 1, wherein each locking means is of the rocking lever type with said first branch including a cam-follower wheel fitted at the end thereof applied against the cam, and having said second branch constituting a bolt including a bearing face engageable with the corresponding stop face of the piston rod.

4. Landing gear according to claim 1, wherein each stop face is an inclined face situated on the opposite side of the piston rod from the rack, in the vicinity of one end of said piston rod.

5. Landing gear according to claim 3, wherein the rocking axes of the locking means are situated on the opposite side of the piston rod from the side on which the shaft is located.

6. Landing gear according to claim 3, wherein each locking means comprises a torsion bar which connects the first branch to the second branch such that said torsion rod is put under increased stress when the active surface of the cam engages said first branch and the second branch is applied against the corresponding stop face of the piston rod.

7. Landing gear according to claim 3, wherein the cam has a non-active surface which extends circumferentially beyond the angular extent of the toothed sector at both opposite ends thereof, and which is connected to the active surface by ramps such that the bearing face of one of the locking means is applied against the corresponding stop face of the piston rod when the rack has moved beyond the end mesh point with the toothed sector.

8. Landing gear according to claim 1, wherein the middle portion of the piston rod having the rack is offset transversely relative to the longitudinal geometrical axis of the actuator, while its end portions have their geometrical axes on said geometrical axis, and wherein the inclined stop faces occur in the zones interconnecting the central portion and the end portions of the piston rod.

9. Landing gear according to claim 1, wherein the additional stroke $L_1$ of both first and second pistons is less than the sliding stroke L of the piston rod inside the second pistons, such that said piston rod upon being displaced the length of the additional stroke $L_1$ one of said first pistons comes and coming into end-of-stroke abutment against a said second piston which itself abuts against the corresponding cylinder bottoms.

10. Landing gear according to claim 1 or 9, further comprising a hydraulic manifold interposed in the actuator's hydraulic circuit, said manifold including two moving slide valves for allowing or preventing hydraulic feed to the actuator, and means for connecting each locking means to a corresponding one of the moving slide valves in such a manner that, when one of the locking means is actuated by the cam, the corresponding slide valve prevents hydraulic feed to the valve.

* * * * *